(12) United States Patent
Hetzke, Jr.

(10) Patent No.: US 7,004,641 B1
(45) Date of Patent: Feb. 28, 2006

(54) SUBMERSIBLE FIBER OPTIC LIGHTING SYSTEM

(76) Inventor: Allyn E. Hetzke, Jr., 14 Silver Fox Dr., Fairport, NY (US) 14450

( * ) Notice: Subject to any disclaimer, the term of this patent is extended or adjusted under 35 U.S.C. 154(b) by 121 days.

(21) Appl. No.: 10/246,292

(22) Filed: Sep. 18, 2002

Related U.S. Application Data

(60) Provisional application No. 60/323,252, filed on Sep. 18, 2001.

(51) Int. Cl.
*G02B 6/36* (2006.01)
*G02B 6/00* (2006.01)
*B05B 15/06* (2006.01)
*F16L 3/00* (2006.01)
*F21V 17/00* (2006.01)

(52) U.S. Cl. .................. 385/76; 385/134; 385/137; 362/581; 248/80; 248/121; 248/175; 248/176.1

(58) Field of Classification Search ............ 385/134, 385/136, 137, 147, 76, 77, 78, 81, 84, 93, 385/88, 90, 901; 362/581; 248/176.1, 74.1, 248/51, 80, 121, 175, 74
See application file for complete search history.

(56) References Cited

U.S. PATENT DOCUMENTS

| | | | | |
|---|---|---|---|---|
| 2,999,644 A | * | 9/1961 | Nobinger | 239/229 |
| 4,170,995 A | * | 10/1979 | Levine et al. | 248/74.1 |
| 4,307,862 A | * | 12/1981 | Claussen | 248/121 |
| 4,790,500 A | * | 12/1988 | Mori | 248/49 |
| 4,898,542 A | * | 2/1990 | Jones, Jr. | 439/371 |
| 5,161,874 A | * | 11/1992 | Benes | 362/552 |
| 5,236,160 A | * | 8/1993 | Sechelski | 248/125.1 |
| 5,629,996 A | * | 5/1997 | Rizkin et al. | 385/31 |
| 6,392,147 B1 | * | 5/2002 | Hier et al. | 174/70 C |
| 6,508,442 B1 | * | 1/2003 | Dolez | 248/74.1 |

* cited by examiner

*Primary Examiner*—Edward J. Glick
*Assistant Examiner*—Krystyna Suchecki
(74) *Attorney, Agent, or Firm*—Nixon Peabody LLP

(57) ABSTRACT

A support stand intended to support a terminus of fiber optic cable includes: a base member, a ferrule-receiving member, and a connector that connects the ferrule-receiving member to the base member. Kits including a light source, a lighting grade fiber optic cable harness, and one or more support stands of the present invention are also disclosed.

20 Claims, 3 Drawing Sheets

FIBER OPTIC CABLE HARNESS WITH FIXTURES ATTACHED

SUBMERSIBLE FIBER OPTIC LIGHTING SYSTEM

This application claims the priority benefit of U.S. Patent Application Ser. No. 60/323,252 filed Sep. 18, 2001, which is hereby incorporated by reference in its entirety.

FIELD OF THE INVENTION

The present invention relates generally to a submersible fiber optic lighting system, as well as various components thereof, and their use in illuminating water features such as ponds, streams, and waterfalls.

BACKGROUND OF THE INVENTION

More and more homeowners are re-designing their homes and their yards so that they can find greater peace and enjoyment from their property. One approach for landscaping exterior as well as interior environments involves the construction of ponds and other water features, such as streams and waterfalls. With various water features of the type described above, fish, and great numbers of interesting plant life, it is most desirable to illuminate the environment or various components thereof so that the entire environment can be enjoyed both day and night. To accomplish the desired lighting, a lighting system is needed that is both easy to install and to adjust, as well as safe in most any environment.

The present invention is directed to achieving these objectives and otherwise satisfying the deficiencies in the industry.

SUMMARY OF THE INVENTION

A first aspect of the present invention relates to a support stand intended to support a terminus of fiber optic cable. The support stand includes: a base member including (i) a first portion that defines a substantially planar support surface and (ii) a second portion that defines a first axis and extends substantially upright from the first portion, the second portion having an upper end and an aperture formed through the second portion at the upper end, wherein the first portion includes an arcuate segment and a radial segment, the arcuate segment extending up to about 360 degrees around the first axis and the radial segment extending inwardly of the arcuate segment, connecting the first portion to the second portion; a ferrule-receiving member having a first portion that defines a substantially annular ferrule receiving element and a second portion having an aperture formed therein; and a connector that extends through the apertures of the second portion of the base member and the second portion of the ferrule-receiving member, and connects the ferrule-receiving member to the base member.

A second aspect of the present invention also relates to a support stand intended to support a terminus of fiber optic cable. The support stand includes: a base member including (i) a first portion that defines a substantially planar support surface and (ii) a second portion that defines a first axis and extends substantially upright from the first portion, the second portion having an upper end and an aperture formed through the second portion adjacent the upper end; a loop strap having a first portion, which is sized and configured to receive a ferrule of a fiber optic cable, and a second portion, which has an aperture formed therein; and a connector that extends through the apertures of the second portion of the base member and the second portion of the loop strap, and connects the loop strap to the base member.

A third aspect of the present invention relates to kits which are intended for use in lighting residential and commercial ponds and other water features, as well as plant life or other focal points in or adjacent to the water. The kits include: a light source (or illuminator); a lighting grade fiber optic cable harness; and one or more support stands of the present invention.

A fourth aspect of the present invention relates to a fiber optic cable harness that includes: an optical port which is adapted to couple to a light source; a plurality of fiber optic cables, each cable comprising a sheathing and a plurality of optical fibers contained within the sheathing, each cable having a first end coupled to the optical port and a second end; a ferrule secured to the second end of each of the plurality of fiber optic cables; and a heat shrink film that encapsulates at least a portion of each ferrule and at least a portion of the sheathing on each fiber optic cable.

A number of features provided by the present invention afford a submersible fiber optic lighting system that is simple to install and adjust. The support stand of the present invention, by virtue of its design, can be rotated about the axis of the upright portion thereof to adjust the direction in which light is projected. Because the majority of the first (lower) portion of the support stand is substantially equispaced about the axis defined by the second (substantially upright) portion thereof, the support stand can be rotated without significant interference from covering materials (e.g., stone, soil, gravel, etc.). Specifically, the arcuate segment of the lower portion can travel along the same path as the support stand is rotated about the axis of the upper portion, thereby minimizing resistance caused by covering materials acting on the lower portion of the stand. Moreover, the ferrule-receiving member can be rotated about an axis (perpendicular to the axis defined by the upper portion of the stand) to allow light to be directed along various inclinations or declinations (depending on the location of the stand relative to the object to be illuminated). Finally, the assembly method used for preparing the termini of the optical fiber harness (i.e., coupling of the optic cables to the ferrules) can result in greater durability of the lighting system by minimizing degradation of the optic cable-ferrule connection.

DETAILED DESCRIPTION OF THE INVENTION

One aspect of the present invention relates to a support stand that is intended to support a terminus of fiber optic cable.

Figure 1:
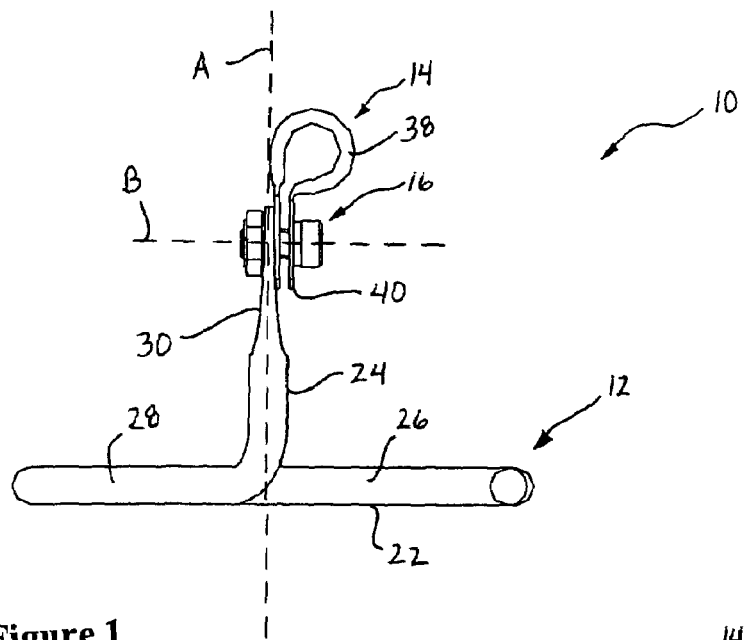
FIG. 1 is a front elevational view of a support stand of the present invention.
Figure 2:
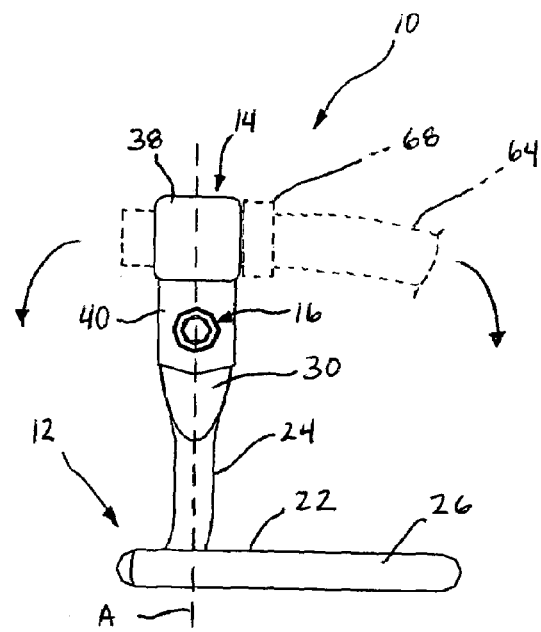
FIG. 2 is a side elevational view of the support stand illustrated in FIG. 1. A ferrule and cable are illustrated in an installed position by phantom lines. Arrows indicate the direction in which the ferrule-receiving member can be adjusted for purposes of directing the light emanating from the optic cable.
Figure 3:
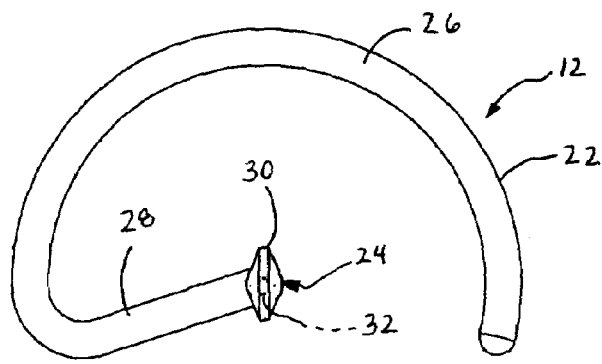
FIG. 3 is a top plan view of a support stand of the present invention.

Referring to FIGS. 1–3, a support stand 10 of the present invention includes a base member 12, a ferrule-receiving member 14, and a connector 16.

The base member 12 generally includes a first or lower portion 22 that defines a substantially planar support surface and a second or upper portion 24 that extends substantially upright from the lower portion 22 and defines a first axis A. In a preferred embodiment, axis A is substantially perpendicular to the substantially planar surface defined by the lower portion 22.

As shown most clearly in FIG. 3, the lower portion 22 includes two integral segments, an arcuate segment 26 and a radial segment 28. In a preferred embodiment, the arcuate segment 26 is substantially equidistant from the axis A along its entire length (i.e., until it merges with the radial segment). The radial segment 28 extends radially inwardly from where it is integrally merged with the arcuate segment 26 until it integrally merges with the upper portion 24. The end 30 of the upper portion 24 is characterized by a paddle-shape, having a broadened yet reduced thickness configuration. The end 30 also defines an aperture 32 which passes therethrough, preferably centrally of its paddle-shaped configuration.

To provide sufficient stability for the base member 12 as it supports the terminus of an optic cable, the arcuate segment preferably extends up to about 360 degrees about axis A. In preferred embodiments, the arcuate segment extends between about 180 degrees to about 360 degrees around axis A, most preferably about 180 degrees up to at least about 270 degrees around axis A. As shown in FIG. 3, the arcuate segment 26 extends about 210 degrees around axis A. While the arcuate segment can be less than 180 degrees about axis A, greater stability is afforded when it is greater than about 180 degrees, thereby preventing or at least resisting against the stand toppling over under the weight and stress of the optic cable terminus.

The base member 12 can be formed out of a variety of materials, including metals and plastics. However, anodize aluminum is a preferred material since it is strong and sufficiently corrosion resistant, particularly around a water environment. The base member 12 can be cast or, for plastics, injection molded. Alternatively, the base member 12 can be formed from, e.g., a stock aluminum rod by cold- or hot-forging of the end 30. After forming the end 30, the aperture 32 can be formed therein by drilling or the like and then the rod is bent to form the upper portion 24, followed by bending of the lower portion 22 to define its arcuate segment 26 from its radial segment 28. Bending can be accomplished using, e.g., a bending jig adapted to receive a particular length and dimension of stock material. When aluminum is used, it can be anodize in bulk either before or after shaping into the base member 12.

The ferrule-receiving member 14 can be virtually any device that is adapted to receive a ferrule at the end of an optic cable. Additionally, such a device preferably includes a first or annular portion 38 that defines a substantially annular ferrule receiving element and a second portion 40 having an aperture formed therein. According to a preferred embodiment, as illustrated in FIGS. 1–3, the ferrule-receiving member 14 is in the form of a loop strap that is at least partially lined or coated with a cushioning material. Suitable cushioning materials include, without limitation, an ethylene propylene diene monomer, nylon, and tefzel. Other suitable cushioning materials are known in the art and can similarly be utilized.

The connector 16 can be virtually any suitable connector that can connect the ferrule-receiving member 14 to the end 30 of the base member 12. Preferably, the connector 16 also defines a second axis B that is substantially perpendicular to the first axis A, and the connector renders the ferrule-receiving member 14 adjustable about the second axis. As a result of its adjustability about axis B, the ferrule-receiving member is preferably adjustable between a first position, whereby a ferrule mounted therein is substantially perpendicular to and facing toward the base member 12, and a second position, whereby a ferrule mounted therein is substantially perpendicular to and facing away from the base member 12. The opposed directions of movement are illustrated by the arrows in FIG. 2.

According to a preferred embodiment, the connector 16 is in the form of a bolt or machine screw in combination with an appropriate nut (e.g., locking nut). If a locking nut cannot be employed, then a locking washer can also be used with a non-locking nut.

In addition, a gasket or washer formed from an insulating material (e.g., rubber, nylon, etc.) can be placed between the end 30 and the ferrule-receiving member 14. The purpose of the gasket or washer is to prevent metal-to-metal contact that can promote corrosion of the metal(s).

In use, a prepared optic cable terminating at a ferrule can be inserted into the ferrule-receiving member 14 such that cable extends over the lower portion 22 of the base member 12 (as illustrated in FIG. 2 by phantom lines). Thereafter, the connector 16 can be tightened sufficiently to prevent release of the ferrule from the ferrule-receiving member (but not so tight that the ferrule-receiving member cannot rotate about axis B). The support stand can be positioned in a desired location and, if desired, the base and cable can be buried under a suitable covering material (e.g., gravel, sand, stones, glass, etc.). Before tightening any further, the support stand can be adjusted by rotating the stand about axis A to direct light emanating therefrom toward a particular target and/or rotating the ferrule-receiving member 14 about axis B to change the elevation of lighting on the target. Because the arcuate segment lies equidistant from the axis A, minimal resistance against such rotation is provided by any covering materials. Once the desired location and direction of the stand is achieved, the connector 16 can be fully tightened.

A further aspect of the present invention relates to a kit that includes a support stand of the present invention. The kit 50, illustrated in FIG. 4, includes a plurality of support stands 10 (four shown), a lighting grade fiber optic cable harness, 60, and an illuminator or light source 62. The cable harness 60 includes a plurality of optic cables 64 (four shown) that are bundled together to form an optic port 66 at one end thereof. (The opposite ends thereof are prepared with a ferrule secured thereon, as illustrated separately in FIG. 5.) The optic port 66 is intended to be installed into an appropriately configured and positioned receptacle within the illuminator 62. The illuminator 62 includes a power cord (or hard-wire capability), bulb (lamp source) receptacle, (lamp source) bulb, transformer or ballast, UV filter, fan, and optionally a color wheel with motor assembly. Illuminators, cable, and blank ports are commercially available from most fiber optic lighting vendors. Harnesses can be prepared with more than four or fewer than four cables. The kit may optionally include an instruction manual indicating where to place the illuminator, guidelines for placement of the support stands, and instructions for adjusting the stands to direct light toward a particular feature.

The kit affords many benefits, allowing installation by the average homeowner or contractor without the need for special tools. As a result, the kit can be installed easily and in a short amount of time.

Figure 4:
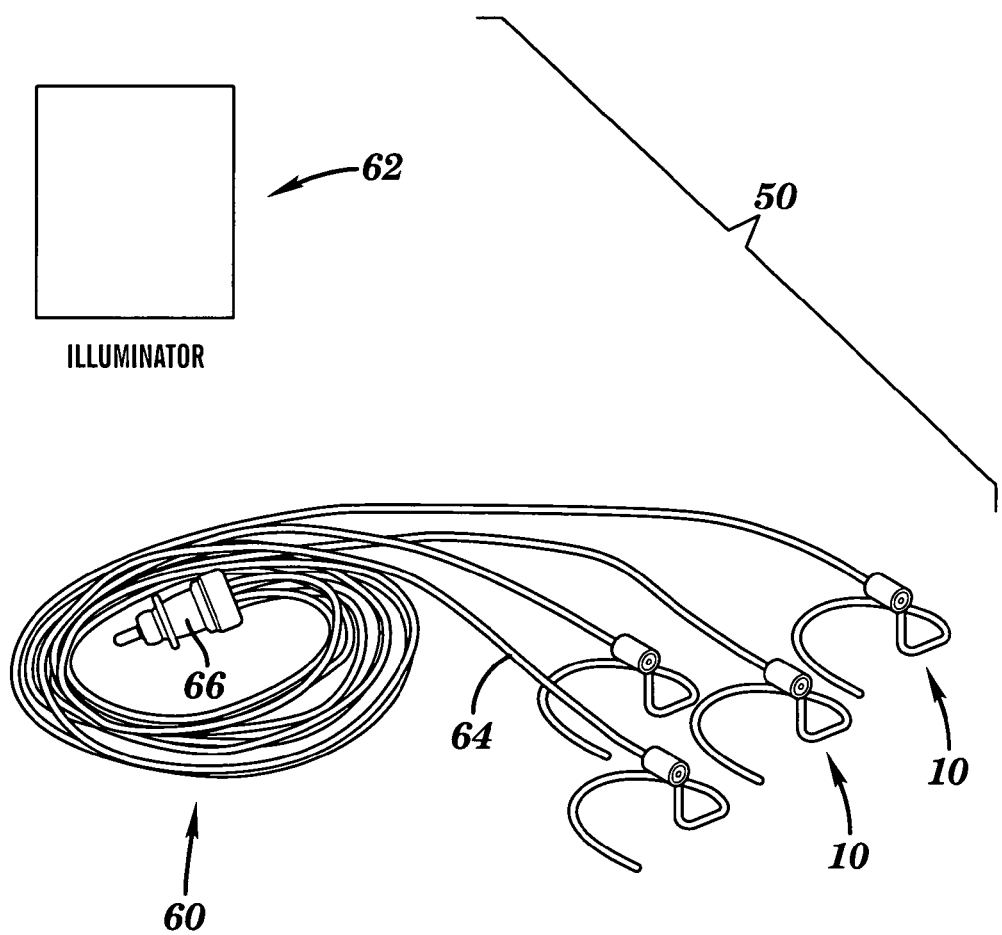
FIG. 4 is perspective view of a kit in accordance with the present invention.
Figure 5:
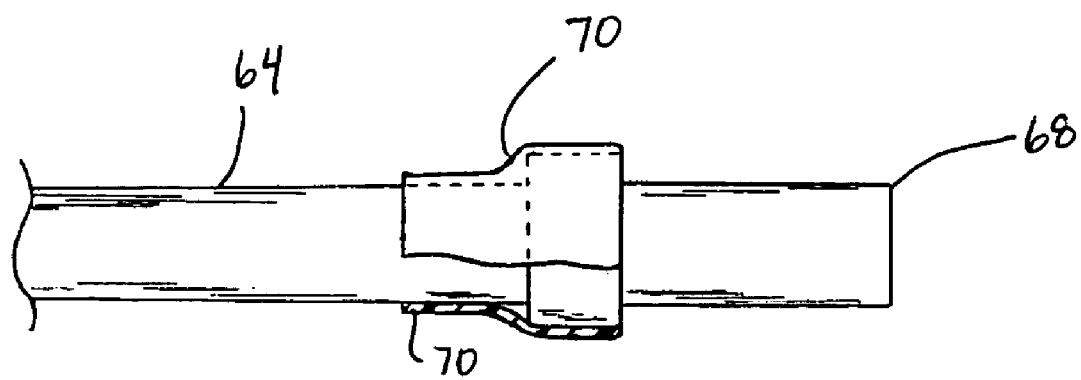
FIG. 5 is a side elevational view illustrating the connection provided at the terminus of the optic cables. A ferrule placed over the end of the optic cables is secured in place with an adhesive lined heat shrink film, part of which is broken away in the figure to expose the portion of the cable and the portion of the ferrule normally covered by the shrunken film.

To enhance both the appearance of the ferrule as well as the durability of the ferrule/optic cable connection, a further aspect of the present invention relates to an improved ferrule connection for a fiber optic cable harness. As shown in FIGS. 4 and 5, a fiber optic cable harness 60 includes an optical port 66 which is adapted to couple to a light source, a plurality of fiber optic cables 64 where each cable includes a sheathing that contains a plurality of optical fibers and each cable has a first end coupled to the optical port and a second end. A ferrule 68 is secured to the second end of each cable using a heat shrink film 70 that encapsulates at least a portion of each ferrule and, preferably, at least a portion of the sheathing on each fiber optic cable.

Preferred heat shrink films capable of such use include polyolefin films, preferably those having a shrink ratio of about 2.5:1 to about 5:1, preferably about 3:1. Suitable polyolefin films are commercially available from vendors such as McMaster-Carr Supply Co. (New Brunswick, N.J.). Preferred polyolefin films are those that are adhesive lined.

In preparing the cable harness as described above, the ferrule will be installed onto the optic cables in a conventional manner (i.e., using appropriate epoxies or cements), followed by placing the adhesive lined shrink tubing over the ferrule such that the tubing extends slightly past the termination end of the ferrule. Thereafter, using a heat gun, the film is shrunken to fit, thereby reinforcing the epoxy and providing a professional looking appearance. The remainder of the ferrule assembly procedure can be carried out according to convention. Because of the seamless film tubing that encapsulates the ferrule-optic cable connection, it is unlikely that the film will tear away from the ferrule, which is quite common when tapes are employed for the same purpose. As a result, enhanced durability is provided while installation times can be shortened dramatically. Specifically with regard to durability, because the heat shrink film helps to reinforce the epoxies or cements used to secure the ferrule to the optical fibers contained therein, the heat shrink film allows the cable-ferrule connection to endure significantly greater handling abuse than previously used approaches, such as tapes and the like wrapped around the ferrule.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A support stand intended to support a terminus of fiber optic cable, the support stand comprising:
    a unitary base member comprising:(i) a first portion that defines a substantially planar support surface and (ii) a second portion that defines a first axis and extends substantially upright from the first portion, the second portion having an upper end and an aperture formed through the second portion at the upper end, wherein the first portion includes an arcuate segment and a radial segment, the arcuate segment extending up to about 360 degrees around the first axis and the radial segment extending inwardly of the arcuate segment, connecting the first portion to the second portion;
    a ferrule-receiving member having a first portion that defines a substantially annular ferrule receiving element and a second portion having an aperture formed therein; and
    a connector that extends through the apertures of the second portion of the base member and the second portion of the ferrule-receiving member, connecting the ferrule-receiving member directly to the base member.

2. The support stand according to claim 1, wherein the second portion is substantially perpendicular to the first portion.

3. The support stand according to claim 1, wherein the arcuate segment extends between about 180 degrees to about 270 degrees around the first axis.

4. The support stand according to claim 1, wherein the connector defines a second axis substantially perpendicular to the first axis and renders the ferrule-receiving member adjustable about the second axis.

5. The support stand according to claim 4, wherein ferrule-receiving member is adjustable between a first position, whereby a ferrule mounted therein is substantially perpendicular to and facing toward the base member, and a second position, whereby a ferrule mounted therein is substantially perpendicular to and facing away from the base member.

6. The support stand according to claim 1, wherein the base member has a substantially cylindrical cross-section over substantially the entire length thereof.

7. The support stand according to claim 1, wherein the upper end of the second portion of the base member has a paddle-shaped configuration characterized by a reduced thickness.

8. The support stand according to claim 7, wherein the aperture formed in the second portion is formed through the paddle-shaped configuration of the upper end.

9. The support stand according to claim 1, wherein the ferrule-receiving member comprises a loop strap.

10. The support stand according to claim 9 further comprising:
    a cushioning material which lines, at least partially, the first portion of the loop strap.

11. The support stand according to claim 10, wherein the cushioning material is an ethylene propylene diene monomer.

12. The support stand according to claim 1 wherein the connector comprises:
    a bolt and a nut secured about a threaded end of the bolt.

13. A kit comprising:
    a light source;
    a lighting grade fiber optic cable harness; and
    one or more support stands according to claim 1.

14. A support stand intended to support a terminus of fiber optic cable, the support stand comprising:
    a unitary base member comprising:(i) a first portion that defines a substantially planar support surface and (ii) a second portion that defines a first axis and extends substantially upright from the first portion, the second portion having an upper end and an aperture formed through the second portion at the upper end;
    a loop strap having a first portion, which is sized and configured to receive a ferrule of a fiber optic cable, and a second portion, which has an aperture formed therein; and
    a connector that extends through the apertures of the second portion of the base member and the second portion of the loop strap and connects the loop strap directly to the base member.

15. The support stand according to claim 14, wherein the connecting means defines a second axis substantially perpendicular to the first axis, the connecting means rendering the loop strap adjustable about the second axis.

16. The support stand according to claim 15, wherein loop strap is adjustable between a first position, whereby a ferrule mounted therein is substantially perpendicular to and facing toward the base member, and a second position, whereby a ferrule mounted therein is substantially perpendicular to and facing away from the base member.

17. The support stand according to claim 14 further comprising:
   a cushioning material which lines, at least partially, the first portion of the loop strap.

18. The support stand according to claim 17, wherein the cushioning material is an ethylene propylene diene monomer.

19. A kit comprising:
   a light source;
   a lighting grade fiber optic cable harness; and
   one or more support stands according to claim 14.

20. A support stand intended to support a terminus of fiber optic cable, the support stand comprising:

a base member consisting essentially of:(i) a first portion that defines a substantially planar support surface and (ii) a second portion that defines a first axis and extends substantially upright from the first portion, the second portion having an upper end and an aperture formed through the second portion at the upper end, wherein the first portion includes an arcuate segment and a radial segment, the arcuate segment extending greater than 180 degrees but less than 360 degrees around the first axis and the radial segment extending inwardly of the arcuate segment, connecting the first portion to the second portion;

a ferrule-receiving member having a first portion that defines a substantially annular ferrule receiving element and a second portion having an aperture formed therein; and a connector that extends through the apertures of the second portion of the base member and the second portion of the ferrule-receiving member, connecting the ferrule-receiving member directly to the base member.

* * * * *